United States Patent
Schiavina

(10) Patent No.: US 9,376,268 B2
(45) Date of Patent: Jun. 28, 2016

(54) APPARATUS FOR ORDERLY SUPPLY OF A GROUP OF TRAYS TO A SEALING MACHINE OF SAID TRAYS, WITH APPLICATION OF A COVERING FILM

(71) Applicant: GRUPPO FABBRI VIGNOLA S.P.A., Vignola (IT)

(72) Inventor: Andrea Schiavina, Correggio (IT)

(73) Assignee: Gruppo Fabbri Vignola S.p.A., Vignola (IT)

( * ) Notice: Subject to any disclaimer, the term of this patent is extended or adjusted under 35 U.S.C. 154(b) by 0 days.

(21) Appl. No.: 14/397,692

(22) PCT Filed: Jun. 18, 2013

(86) PCT No.: PCT/EP2013/062661
§ 371 (c)(1),
(2) Date: Oct. 29, 2014

(87) PCT Pub. No.: WO2014/001159
PCT Pub. Date: Jan. 3, 2014

(65) Prior Publication Data
US 2015/0096867 A1    Apr. 9, 2015

(30) Foreign Application Priority Data
Jun. 26, 2012  (BO) .................. BO2012A000353

(51) Int. Cl.
*B65G 37/00* (2006.01)
*B65G 43/08* (2006.01)
(Continued)

(52) U.S. Cl.
CPC ............. *B65G 47/268* (2013.01); *B65G 15/12* (2013.01); *B65G 37/00* (2013.01); *B65G 43/08* (2013.01)

(58) Field of Classification Search
CPC ........................... B65G 47/268; B65G 37/005
USPC ............. 198/413, 463.3, 464.1, 464.2, 464.3, 198/468.6, 476.1, 502.2, 575, 578, 597, 198/607, 774.1
See application file for complete search history.

(56) References Cited

U.S. PATENT DOCUMENTS

| 2,237,345 | A | * | 4/1941 | Frentzel, Jr. | ........... B65G 47/66 198/600 |
| 3,187,883 | A | * | 6/1965 | Umbricht | ............... B23Q 7/003 198/774.1 |

(Continued)

FOREIGN PATENT DOCUMENTS

| EP | 0334266 | 9/1989 |
| EP | 0680880 | 11/1995 |

OTHER PUBLICATIONS

International Search Report and Written Opinion for International Application No. PCT/EP2013/062661; Jul. 25, 2013; 10 pages.

*Primary Examiner* — Douglas Hess
(74) *Attorney, Agent, or Firm* — Stetina Brunda Garred & Brucker

(57) ABSTRACT

The external conveyor supplying the trays coming from the filling machine is connected to a conveyor formed of parallel straps or belts, which has a greater length than the length of the group of trays of larger dimensions to be grouped together and which is provided in the end part with components inserted between the belts, a comb lifter of a length correlated with the length of said tray group to be formed, connected to lifting and lowering means with suitable acceleration and deceleration ramps. Upstream of the lifter, sensors are provided which detect the position in space of the trays arriving from the external conveyor in succession. A processing and control unit is provided to process the information arriving from said sensors.

9 Claims, 3 Drawing Sheets

(51) Int. Cl.
*B65G 47/26* (2006.01)
*B65G 15/12* (2006.01)

(56) References Cited

U.S. PATENT DOCUMENTS

| | | | | |
|---|---|---|---|---|
| 4,214,848 A * | 7/1980 | Verwey | ............... | B65G 57/245 198/475.1 |
| RE32,804 E * | 12/1988 | Mason | ................... | B65G 25/02 198/468.6 |
| 4,897,985 A * | 2/1990 | Buchko | .................... | B65B 9/02 53/553 |
| 4,926,999 A * | 5/1990 | Fauth, Sr. | ............... | B65G 47/54 198/358 |
| 5,064,330 A * | 11/1991 | Kumagai | ........... | B29D 30/0016 198/463.3 |
| 5,443,150 A * | 8/1995 | Buchko | ................. | B26D 1/045 198/463.3 |
| 6,145,648 A * | 11/2000 | Teichman | .......... | H05K 13/0061 198/468.6 |
| 6,595,349 B2 * | 7/2003 | MacSwan | ............. | B65G 47/54 198/370.09 |
| 6,681,916 B2 * | 1/2004 | Hiroki | ................... | B65G 35/06 198/347.1 |
| 6,719,126 B2 * | 4/2004 | Badier | ................... | B65G 47/53 198/413 |
| 6,769,529 B2 * | 8/2004 | Fournier | ................ | B27B 31/04 198/395 |
| 6,845,860 B1 * | 1/2005 | Walker | ................... | B65G 47/53 198/433 |
| 7,204,364 B2 * | 4/2007 | Allgaier | ................ | B65G 47/54 198/465.1 |
| 7,287,636 B2 * | 10/2007 | Itoh | ....................... | B65G 47/54 198/370.1 |
| 8,356,965 B2 * | 1/2013 | Michels | ................ | B65G 47/66 198/600 |
| 8,887,894 B2 * | 11/2014 | Lu | .......................... | B65G 47/52 198/463.3 |

* cited by examiner

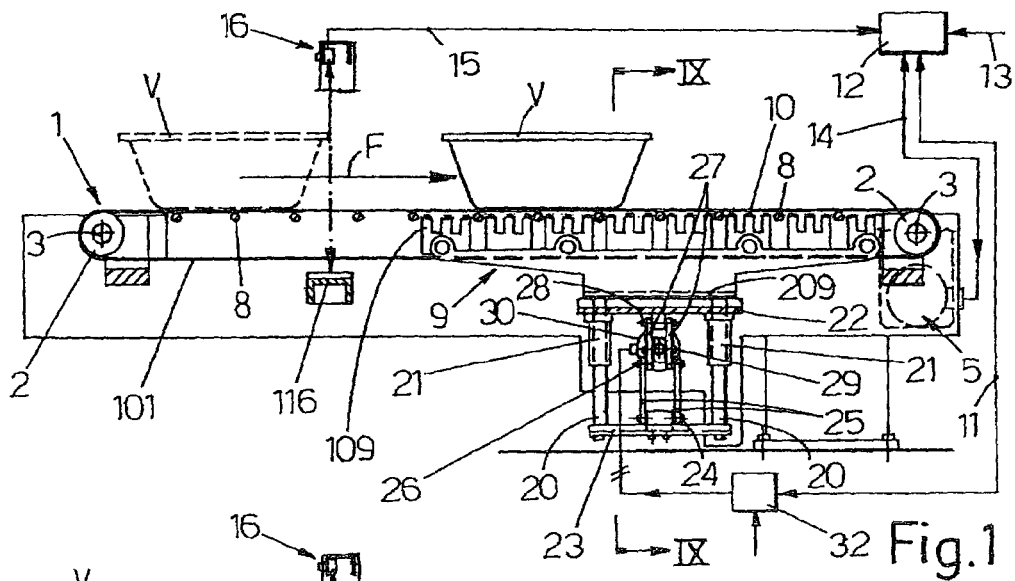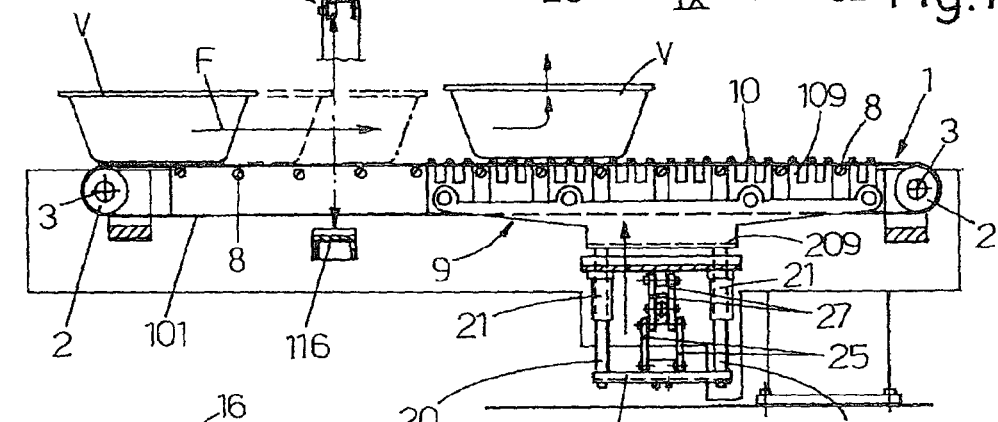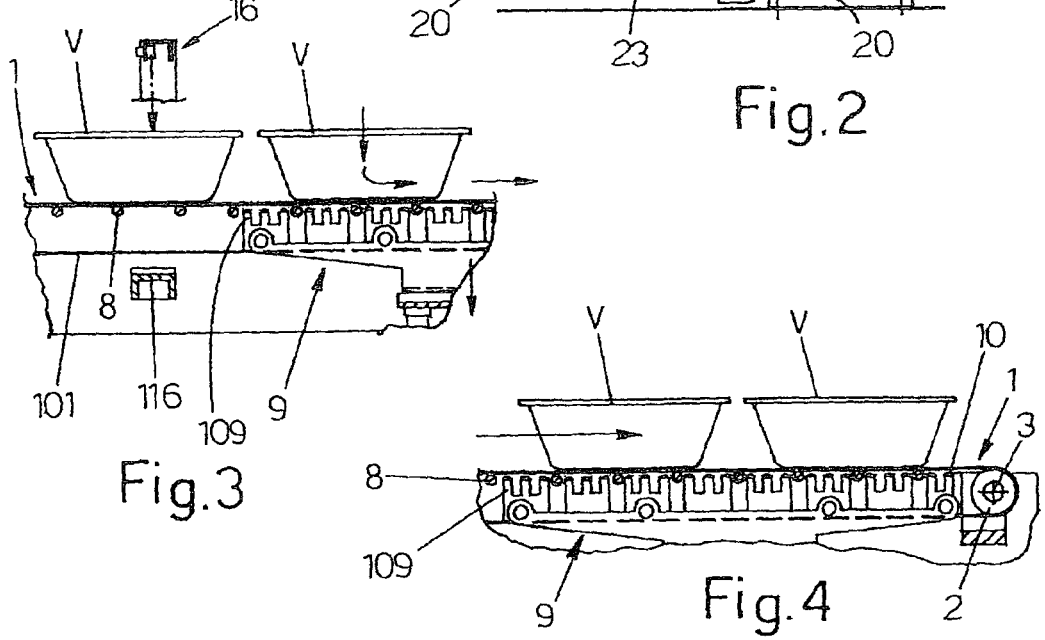

US 9,376,268 B2

APPARATUS FOR ORDERLY SUPPLY OF A GROUP OF TRAYS TO A SEALING MACHINE OF SAID TRAYS, WITH APPLICATION OF A COVERING FILM

CROSS REFERENCE TO RELATED APPLICATIONS

The present application claims priority to PCT International Application No. PCT/EP2013/062661 filed on Jun. 18, 2013, which claims priority to Italian Patent Application No. BO2012A000353 filed Jun. 26, 2012, the entirety of the disclosures of which are expressly incorporated herein by reference.

STATEMENT RE: FEDERALLY SPONSORED RESEARCH/DEVELOPMENT

Not Applicable.

BACKGROUND OF THE INVENTION

The invention relates to machines designed to apply a closing film on trays containing a product, such as a food product, provided with a sealing and cutting station with opposing bells, between which groups of trays and an overhead section of film unwound from a coil are cyclically positioned and which, on command, are reciprocally closed to heat seal a portion of covering film on the upper edge of the trays, after possible conditioning of the atmosphere inside said trays, and then to separate around the perimeter, by cutting, the cover of each tray from the off-cut of surrounding film and which, lastly, are opened to prepare for offloading of the sealed trays and to prepare for removal of the off-cut of film, usually connected to a collection axis. These machines are provided upstream of said sealing station with a station which collects together and orders groups of trays to be inserted all together into said station, downstream of which a removal conveyor and pincer means are provided to perform simultaneously, with the sealing station open, transfer of groups of open trays from the first collection station to the second sealing and cutting station and sealed trays from said station to the final removal station. The invention relates in particular to the first tray collection station and cites as the prior art patent EP 334 266, which envisages said station being formed of a conveyor with intermittent motion, which stops cyclically to await the containers which are supplied to it by the unloading conveyor of the customer's machine, which fills the trays with the product. In certain cases, the trays contain liquid products, so it is necessary to make said changes in speed of the collection belt in an extremely gradual manner, with suitable deceleration and acceleration ramps, to prevent the liquid in the trays from overflowing or soiling the upper edge of said trays, prejudicing the successful outcome of the subsequent step of heat.sealing with the covering film. In order to overcome these problems, patent EP 680 880 describes how to perform said tray collection operation without the corresponding collection conveyor having to stop cyclically. This condition is obtained by arranging a compensation conveyor between the customer's collection conveyor and supply conveyor and by providing means of detecting the distance and speed of the trays inserted on said compensation conveyor, to guide the means of motion of said conveyor, so that it inserts the trays with a predetermined speed and position on the collection conveyor, which thus no longer needs to stop in succession, as indicated in EP 334 266, with the consequent advantages.

The second solution considered above considerably extends the length of the whole collection station, complicates its construction, considerably increases its costs and reduces its technological reliability, due to the major presence of sensors and all the processing and calculation means associated with them.

SUMMARY OF THE INVENTION

The invention is intended to overcome these and other limitations of the prior art with a solution as claimed in appended Claim 1) and the subsequent dependent claims, which envisages the use of a variable motion conveyor, which simultaneously performs the function of both compensation conveyor and collection conveyor and is formed of parallel straps or belts, which carries a comb lifter to the end part of them, inserted between the belts, and which is provided in the initial part with sensors which detect the position in space of the tray which arrives in succession from each row of the supply conveyor. A processing and control unit processes the information coming from said sensors, from a transducer which detects the advance speed of the conveyor belt and therefore the information of said trays and from software to which information relating to at least the dimensions of the trays to be closed is supplied each time. Said processing and control unit ensures that when the tray reaches the initial part of the comb lifter, in the lowered position, said lifter is raised by a small amount sufficient to release the tray from the movement of the conveyor belt and, when the second tray arrives upstream of the conveyor and in a specific position, the lifter itself lowers to allow the second tray which advances with the first tray and at a predetermined distance from it to enter it as well, and, when the second tray has entered onto the conveyor, this is raised and the cycle is repeated until the last tray of the group to be formed is lifted, in correspondence with which the lifer is raised with a higher run than the previous runs, sufficient to allow insertion below the tray group of the teeth of a comb, which, while the lifter is lowered to allow repetition of a new working cycle, takes over support of the trays and transfers them to the sealing and cutting station. The conveyor belt operates with variable motion and said cyclic lifting and lowering movement of the lifter occurs with acceleration and deceleration ramps such as to ensure the tray and the products they contain are influenced as little as possible by the changes in motion and remain in a stable position, even if liquid in nature. For this same purpose, it may also be envisaged that the lifter performs small horizontal translation movements during the lifting and lowering runs, so as to lift and lower the trays, respectively by taking them from and releasing them to the conveyor belt at speed.

BRIEF DESCRIPTION OF THE DRAWINGS

Further characteristics and advantages of the invention will become more apparent from the following description of a preferred embodiment, illustrated by way of a non-limiting example in the figures in the three tables of drawings attached, wherein:

FIGS. 1, 2, 3, 4, 5, 6, 7 show the apparatus in schematic form, in side elevation and during the subsequent steps of its working cycle;

DETAILED DESCRIPTION OF THE INVENTION

Figure 5:
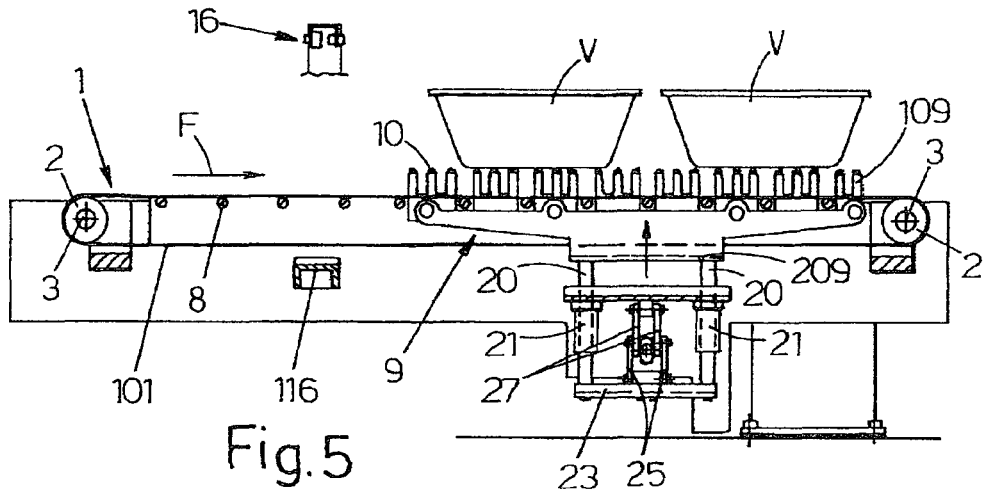
Figure 6:
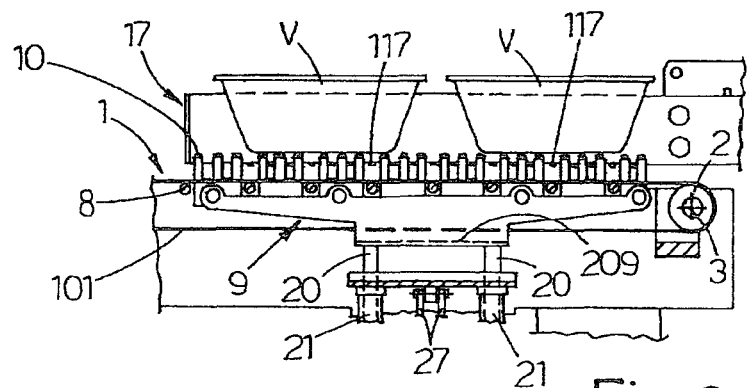
Figure 8:
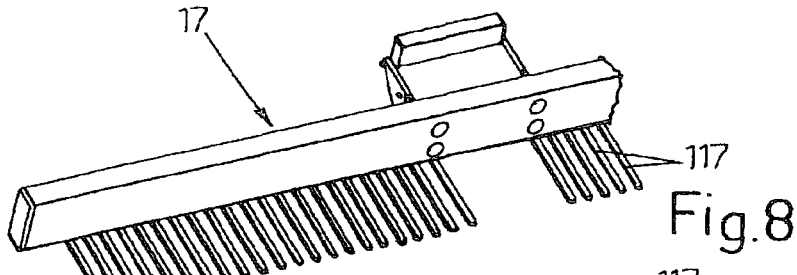
FIG. 8 shows a perspective and partial view of one of the combs for gripping and transferring the trays from the collection station to the sealing station.
Figure 7:
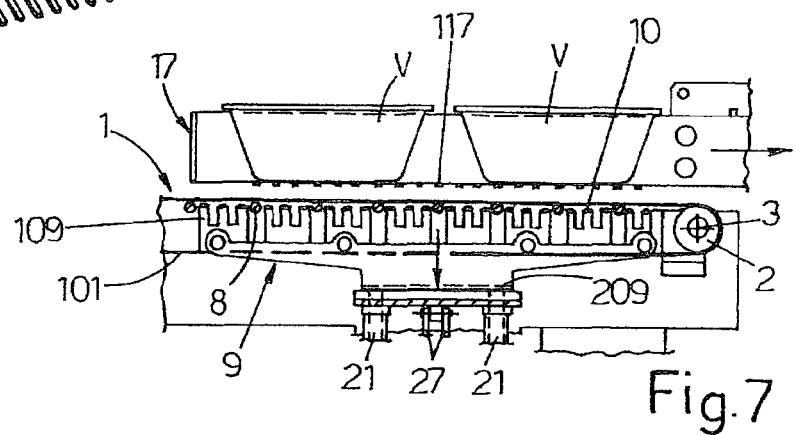
Figure 9:
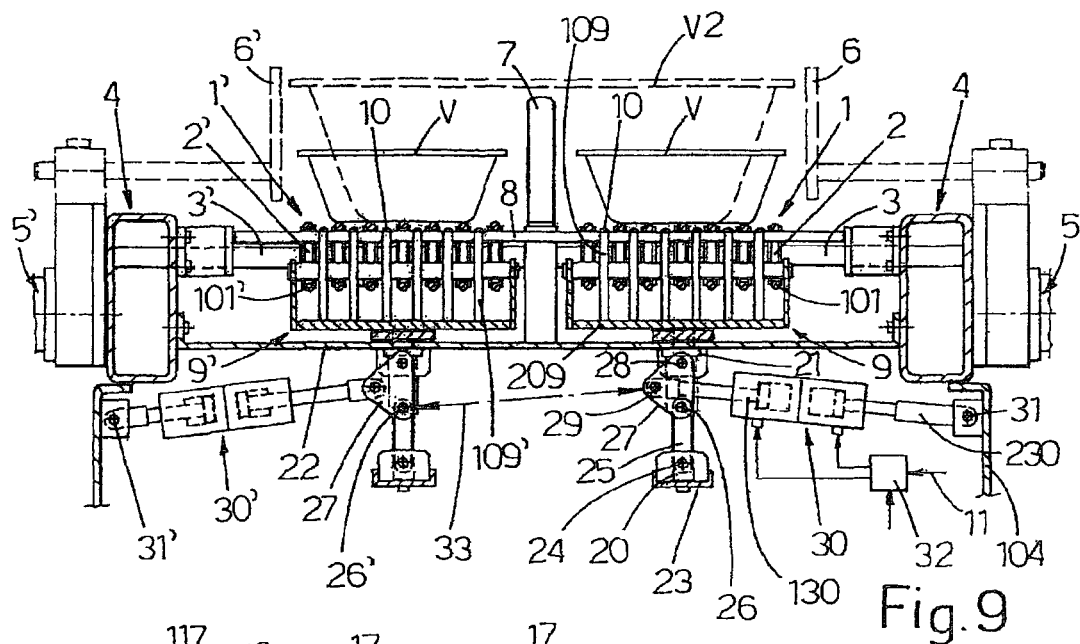
FIGS. 9, 10 and 11 show the apparatus in transversal cross-section, as from the cross-section line of section IX-IX of FIG. 1, and with the lifter respectively in the lowered idle position, in the first lifting position for cyclic formation of the tray group and in the second lifting position for transfer of the tray group to the transfer comb.
Figure 11:
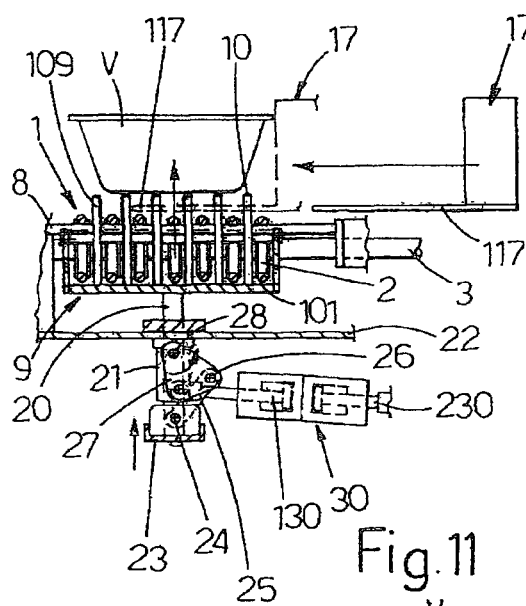
Figure 10:
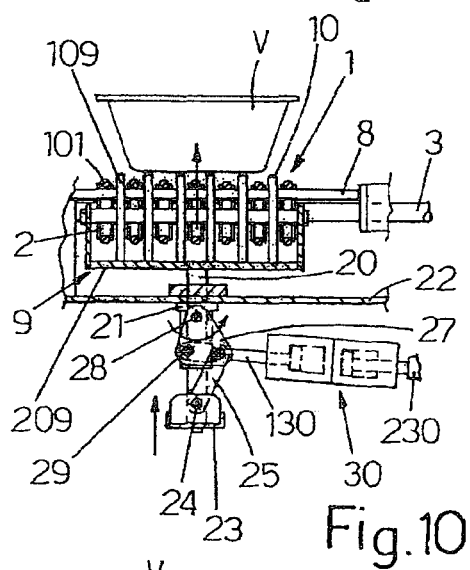
Figure 12:
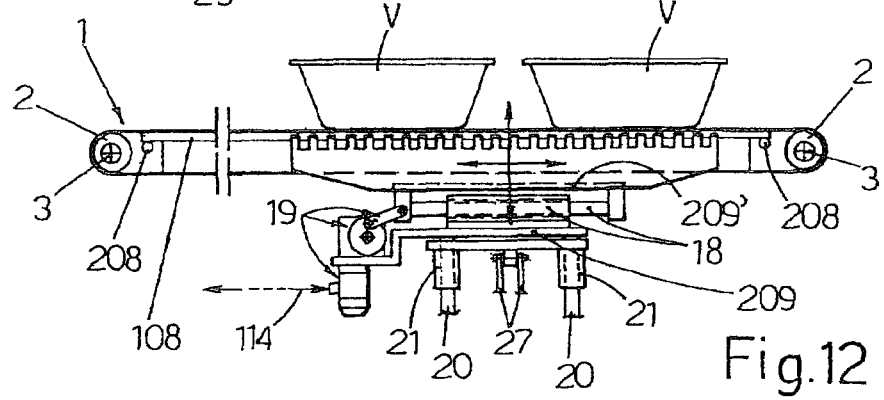
FIG. 12 shows a side elevation and partial view of a construction variant of the apparatus.

The apparatus in question is now described in the version capable of managing two adjacent and parallel rows of small and medium-sized trays, coming from the same number of supply conveyors and which, if necessary, in the presence of large-sized trays, may be adapted to work on a single row of said trays. The apparatus must also be intended as protected if it is arranged to work on more than two parallel rows of trays or even on a single row. Having said this, with reference to FIGS. 1 and 9, it is specified that the apparatus comprises two straight and adjacent conveyors 1, 1', horizontal and parallel to each other, each formed of a plurality of parallel belts 101, 101', for example the Polycord® type, with round cross-section, having a good grip with the bottom of the trays, returned with the ends on pulleys 2, 2' keyed onto shafts 3, 3' supported rotating by the ends of a frame 4 and of which those downstream are connected to respective motion units 5, 5' of the electronic speed control type and with an encoder, which may be governed independently when each conveyor works on its own row of trays V and which may be connected to each other by means of an electric shaft when the two conveyors 1, 1' are combined to transport larger trays V2, as indicated respectively with a continuous line and with a broken line in FIG. 9, where 6,6' denotes lateral and adjustable containment guides of the trays, while 7 denotes a central guide which may be removed when the trays V2 to be processed have large dimensions and must simultaneously rest with the bottom on both conveyors 1 and 1'. With the left end for whoever is looking at FIG. 1, the conveyors 1, 1' are connected to the customer's conveyors supplying the trays to be closed. The upper branch of the belts 101, 101' of the conveyors 1, 1' is maintained on a horizontal plane, for example by resting on transversal and coplanar rollers 8, supported at the ends by the sides of frame 4. The conveyors 1 and 1' have a length correlated with the longest length of the group of trays to be cyclically formed, increased by the length of at least one of the longest trays to be processed and for the section which is destined to be used by the group of trays to be formed, said conveyors 1, 1' are engaged longitudinally in the space between the belts 101, 101', by vertical teeth arranged in the form of a comb 109, 109' of lifters 9, 9', which have a length equal and correlated to the length of the group of trays to be formed and which, with their distal end, are arranged at a short distance from the pulleys 2, 2' of return of the final ends of the conveyors 1, 1', said teeth 109, 109' being arranged so as not to interfere with the levelling rollers 8 of the upper branch of the belts 101, 101' of the conveyors 1, 1'. The tops of the teeth 109, 109' are provided with elastomer inserts 10 which have a good grip on the bottom of the trays to be processed. By means of specific means described hereunder, the teeth 109, 109' may be carried from a lowered idle position with their upper ends 10 just below the bottom of the trays transiting on the belts 101, 101', as shown in FIG. 9, to a minimum raised position as shown in FIG. 10, where the teeth 109, 109' raise the trays by the small amount necessary to distance them from the belts 101, 101', to a position of maximum lifting as shown in FIG. 11, useful for creating between the bottom of the trays and the belts 101, 101', a sufficient space to insert the gripping and transfer means described further on. The lifting and lowering means of the lifters 9, 9', are such as to control these components with a variable motion, with the correct acceleration and deceleration ramps, as described further on. Returning to FIG. 1, it is noted that the control means of the lifters 9, 9' are connected by means of wiring 11 to a processing and control unit 12, which through the input 13, is informed each time of the dimensions of the trays the apparatus must process, which by means of wiring 14 is connected to the means of motion 5, 5' and to the relative encoders, which inform it of the speed of the conveyors 1, 1', and which by means of wiring 15 is connected to sensors 16, which form, for example, a vertical barrier of the optoelectronic type, with a reflector 116 upstream of the lifters 9, 9', and which detects transit of the trays on the conveyors 1, 1'. The electronic unit 12 is provided with software which ensures functioning of the apparatus in the following manner. For the sake of brevity, the functioning of a single conveyor 1 is considered here, as functioning of the nearby conveyor 1' is identical. At the start of the cycle, the conveyor 1 travels with its upper branch in direction F and the comb lifter 9 is in the lowered position, as shown in FIGS. 1 and 9. When the front edge in the direction of travel of the first tray V, indicated in FIG. 1 with a broken line, is detected by the barrier 16, 116, the processor 12 is able to control with precision the position in the subsequent space of said tray and when this reaches the initial part of the comb lifter 9, this is raised by a small amount as shown in FIGS. 2 and 10, sufficient to release said tray from the movement of the conveyor belt 1 and, when the second tray V arrives upstream of the lifter 9 and in a specific position, said lifter is lowered as shown in FIG. 3 to allow the second tray to enter above it, which advances with the first tray and at a pre-set distance from it and, when the second tray has also entered above the lifter 9, as shown in FIG. 4, said lifter 9 is raised and the cycle is repeated until the last group of trays to be formed on said lifter 9 is raised. In other words, the trays are cyclically raised by the lifter 9, so as to be maintained ordered one after the other and to await the next tray, while they are lowered onto the conveyor 1 to be grouped in increasing order and to be arranged increasingly above the aerial projection of the lifter 9. If only two trays are to be positioned on the lifter 9, as shown in the example in the drawings, when the second and last tray arrives, the lifter is raised with a higher run than the previous one, as shown in FIGS. 5 and 11, such as to allow insertion beneath the group of trays of the teeth 117 of a comb 17 (see also FIG. 8) which, while the lifter 9 is lowered to allow repetition of a new working cycle, takes over support of the group of trays and, translating in a known manner, transfers them into the sealing and cutting station. The teeth 117 of the comb 17 are covered with a material which has a good grip on contact with the bottom of the trays, so that said trays do not move during transfer. It is clear that, on a change in height of the trays, it is unnecessary to perform any adjustment on the comb 17, since said trays are always gripped on the bottom. The conveyor belt 1 operates with variable motion, so as to decelerate during transfer of the trays to the lifter 9, which is also raised and lowered with suitable acceleration and deceleration ramps, such as to ensure stable positioning of the product packaged in the trays, even when liquid in nature, and the gravitational component acting on the packaged product in the lifting and subsequent lowering step also contributes to said stability. In order to better achieve the purpose of avoiding jolting the product in the trays, particularly if liquid in nature, it may also be envisaged that the lifter 9 is advanced with small horizontal translation movements during the lifting and lowering runs, so as to raise and lower the trays respectively by taking them from and releasing them to the conveyor belt 1 at speed. In order to achieve this purpose, it may also be envisaged that the teeth 109 of the lifter 9 are provided with sufficient horizontal clearance from the levelling rollers 8 of the conveyor 1 (FIG. 1), or that said rollers 8 are replaced with straight guides 108 beneath each belt 101 and supported solely by the opposite ends of cross-bars 208 fixed to the frame 4, so that the spaces between said belts 101 are completely free, and it may also be envisaged that the bottom plate 209 of the lifter (see FIG. 2) is separate from an underlying support plate 209' connected to the lifting and lowering means and is connected to this, with interposed guiding and sliding means 18, so that the bottom plate 209 may perform a straight movement, even brief, in a parallel direction to the belts 101, said bottom plate 209 being connected to the means of motion 19 carried by the lower plate 209' and such as to impose on said plate 209 the small horizontal movements necessary to allow the teeth 109, 10 of the lifter 9 to pick up the trays at speed from the belts 101 of the conveyor 1 and then release them at speed to said belts, replicating the direction and advance speed of said belts. The number 114 denotes the wiring which connects the motion unit 19 to the processing and control unit 12 of FIG. 1.

With reference to FIGS. 1 and 9-10, the cyclic lifting and lowering means of the lifters 9, 9' are described and, in this case, reference will be made for brevity's sake solely to the lifting means 9, since lifting means 9' are similar (see below). FIGS. 1 and 9 show that the lower plate 209 of the lifter carries jointly a pair of vertical rods 20, which project downwards and rest on an ideal vertical plane which is parallel to the direction of advance of the trays and said rods cross corresponding guide ferrules 21 integral to a beam 22 fixed to the frame 4 of the machine and said rods 20 are connected with the lower end by a cross-bar 23, on the intermediate part of which, in 24, the lower end of a pair of connecting rods 25 has its fulcrum, directed upwards and articulated with the upper end, in 26, to the lower summit of a pair of triangular plates 27 which, with the upper summit, has its fulcrum, in 28, on the middle line of the beam 22. The third summit of the plates 27 is articulated in 29 to the stem 130 of a double-run actuator 30 which, with the opposite stem 230, is articulated in 31 to an appendix 104 of the frame 4 of the machine. The actuator 30 is formed, for example, by the opposing union of the bodies of two small compressed-air cylinder and piston units, controlled by a solenoid valve unit 32 connected to the wiring 11 already discussed with reference to FIG. 1. The actuator 30 is provided with stop dampers. FIG. 9 shows that, when the lifter 9 is in the lowered position, articulations 26, 28 are vertically aligned with each other, i.e. they are positioned at twelve o'clock and at 6 o'clock on a hypothetical clock, while articulation 29 is positioned at around 9 o'clock and the stems 130, 230 of the actuator 30 are both extended. In order to raise lifter 9 with a short run, as shown in FIG. 10, the actuator 30 is controlled by retraction of one of the two stems, for example stem 230, as shown in FIG. 10, with corresponding lifting of the cross-bar 23 and all the equipment associated with it. When lifter 9 must be raised with a long run, on the other hand, both stems 130, 230 of the actuator 30 are retracted, as shown in FIG. 11. It is clear how the solution described allows the acceleration and deceleration produced naturally by movement of articulations 26 and 29 on curved trajectories to be exploited, with the centre of rotation on the fixed and upper fulcrum 28.

FIG. 1 shows that the control means of the lifter 9' have the triangular plates 27' turned in the same direction as those 27 of the mechanism described for lifter 9 and the possibility is envisaged of connecting articulations 29 and 26' to each other by means of a tie rod 33, in order to synchronise the movements of two lifters 9, 9' when they are required to operate on large-sized trays V2 which are resting simultaneously on the conveyors 1 and 1'.

It is also understood that the description relates to a preferred embodiment of the invention, to which numerous construction variants and changes may be made without deviating from the principle of the invention, as described and illustrated in the figures of the three appended tables of drawings and as indicated in the following claims. The references in brackets in the claims are purely indicative and do not limit the area of protection of said claims.

What is claimed is:

1. An apparatus for ordering groups of trays upstream of a sealing and cutting station of a tray sealer, comprising at least a conveyor connected to a corresponding conveyor which supplies the trays coming from a filling machine, the conveyor having a greater length than the length of the group of trays with larger dimensions to be grouped and which comprises, in an initial part, sensors and lifting means of the trays coming from said conveyors and a tray transit speed, characterised by at least said conveyor being formed of parallel straps or belts and being provided in an end part with components inserted between the belts, comb lifter with planar dimensions correlated with those of said group of trays of maximum dimensions to be formed, connected to lifting and lowering means which operate with suitable acceleration and deceleration ramps, said lifting and lowering means being provided upstream of said lifters and detecting a position in space of the trays arriving in succession from an external supply conveyor, and being provided with a processing and control unit for processing the information coming from said sensors, from a transducer which detects the advance speed of said conveyor belt and from software to which information relating to at least the dimensions of the trays to be closed is supplied each time and which is such that the trays are progressively ordered one after the other and at the necessary distance on said comb lifters, which cyclically lifts them and deposits them onto said conveyor, which is controlled with variable motion by said control unit, respectively to maintain them ordered one after the other and to group them in an increasing quantity, with at least the last lifting run of the lifter being envisaged as an amount such as to allow transversal insertion beneath the group of trays ordered on said lifter of horizontal teeth of a comb which, while said lifter returns to the lowered position to repeat a new working cycle, takes over support of the ordered group of trays and then transfers them into the sealing and cutting station of a tray sealer, with an order necessary to supply said station.

2. The apparatus according to claim 1, characterised by said cyclic lifting and lowering means of the comb lifter being such as to raise the comb lifters with equal runs or preferably short runs in the initial and intermediate steps of the tray group formation cycle, sufficient to detach the trays from the underlying conveyor belt and, with a higher run to the previous ones during lifting of the last tray of the group, so as to then insert under the same group of trays the teeth of a gripping and transfer comb.

3. The apparatus according to claim 1, characterised by the teeth of the comb lifters being provided above with an insert which has a sufficiently high grip on contact with the bottom of the trays to ensure stable positioning of the trays on said teeth of the comb.

4. The apparatus according to claim 1, characterised by the teeth of the comb which takes over support of the trays ordered on the conveyor and transfers them into the sealing and cutting station of the tray sealer being covered entirely or partially with a material which has a good grip on contact with the bottom of the trays, so that said trays do not move during transfer.

5. The apparatus according to claim 1, characterised by comprising means which ensure the lifters performs horizontal translation movements during the lifting and lowering runs, to raise and lower the trays respectively by taking them from and releasing them to the conveyor belt at speed.

6. The apparatus according to claim 1, characterised by being provided with two adjacent conveyors with relative combs lifters to manage two adjacent and parallel rows of small and medium-sized trays, coming from the same number of external conveyors, and means being provided to ensure that, in the presence of large-sized trays, said apparatus may be adapted to work on a single row of said trays resting on both conveyors and on both the relative grouping combs lifters which, in this case, are appropriately synchronised with each other.

7. The apparatus according to claim 1, characterised by each lifter having a base with a pair of vertical rods which project downwards and which rest on an ideal vertical plane which is parallel to the direction of advance of the trays and cross corresponding guide ferrules integral to a beam fixed to the frame of the machine and said rods being connected with the lower end of a cross-bar on the intermediate part of which lower end of a pair of connecting rods has its fulcrum, said connecting rods being turned upwards and articulated with the upper end of lower summit of a pair of triangular plates which, with an upper summit has its fulcrum on the middle line of said beam, a third summit of said plates being articulated to the stem of a straight actuator, with double run, which, with an opposite stem is articulated onto an appendix of the frame of the machine, all so as to exploit the natural acceleration and deceleration produced by movement of said articulations on curved trajectories, with a centre of rotation on the fixed and upper fulcrum, to transmit a variable motion to the lifter.

8. The apparatus according to claim 7, characterised by being provided with two adjacent conveyors arranged to manage two adjacent and parallel rows of small and medium-sized trays, coming from the same number of external supply conveyors and, if necessary, in the presence of large-sized trays, by being adaptable to operate on a single row of said trays resting on both conveyors, the mechanism of control of the lifter of the second conveyor having triangular plates turned in the same direction as those of the control mechanism of the lifter of the first conveyor and having the possibility of connecting with each other the articulations of said two mechanisms by means of a tie rod, so as to synchronise the movements of two lifters when they are required to operate on said large-sized trays.

9. The apparatus according to claim 7, characterised by a bottom plate of the lifter being separate from an underlying support plate connected to the lifting and lowering means and being coupled to this with interposed horizontal guiding and sliding means, so that said bottom plate and with it the lifter may perform a straight movement in a parallel direction to the transport belts, said bottom plate being connected to means of motion carried by the lower plate and such as to impose on the upper plate the horizontal movements necessary for the teeth of the lifter to pick up the trays at speed from the belts of the conveyor and then release them at speed to said belts, replicating the direction and advance speed of said belts.

\* \* \* \* \*